United States Patent [19]
Godbersen

[11] 3,865,223
[45] Feb. 11, 1975

[54] SAFETY LOCKED BOAT RAISING DEVICE
[76] Inventor: Byron L. Godbersen, 710 Circle Dr., Ida Grove, Iowa 51445
[22] Filed: Aug. 20, 1973
[21] Appl. No.: 389,480

[52] U.S. Cl. .................... 193/42, 214/84
[51] Int. Cl. ........................ B60p 3/10
[58] Field of Search ............ 214/84, 6 BA, 6 BK; 193/35 SS, 42

[56] References Cited
UNITED STATES PATENTS

| | | | |
|---|---|---|---|
| 472,922 | 4/1892 | Griffith | 214/84 X |
| 1,875,237 | 8/1932 | Hambley | 188/69 X |
| 2,836,278 | 5/1958 | Kindell | 214/84 X |

Primary Examiner—Albert J. Makay
Attorney, Agent, or Firm—Henderson & Strom

[57] ABSTRACT

A boat raising device having a roller attached in offset relation to a shaft and moved between raised and lowered positions by rotation of the shaft. The shaft is rotated by operation of a handle and is locked against rotation by the engagement of a keeper.

1 Claim, 5 Drawing Figures

PATENTED FEB 11 1975

3,865,223

SAFETY LOCKED BOAT RAISING DEVICE

BACKGROUND OF THE INVENTION

This invention relates to boat raising devices employed in conjunction with boat trailers and used to facilitate the loading or unloading of a boat upon a trailer. The greatest problem occurs with respect to the unloading of a boat since trailer bunks have great frictional grab, thereby making it difficult to push a boat off of a trailer. The conventional winches provided on most boat trailers are of no aid in this matter.

A number of methods for unloading boats have been tried including submerging the trailer in water thereby allowing the boat to float off and tilting the whole trailer to such an angle that the boat slides off. Fixed rollers attached to the rear of the trailer have been employed in the latter method to aid in sliding off the boat.

Other methods have emloyed rollers which may be moved between several positions. One such method is shown in applicant's copending application Ser. No. 163,818. While an element of the invention of that application has proved quite satisfactory in reducing the frictional hold of a trailer upon a boat and thereby in facilitating the easy removal of the boat from the trailer, the method of locking utilized has severely hampered access to the operating mechanism of the roller and has caused excess stress and wear to the same mechanism.

Accordingly, there is a need for a more effective and economically efficient method of locking the roller and for a design permitting greater accessibility to the operating mechanism of the roller.

SUMMARY OF THE INVENTION

According to this invention a safety locked boat raising device is provided with a lift assembly having a shaft and roller coupled in offset relation to each other. The shaft and roller are rotated by operation of a handle attached to the shaft, whereby the roller is moved between a raised and lowered position. The shaft is locked against rotation when the roller is in either the raised or lowered position by engagement of a keeper with the shaft.

When the roller is in the lowered position and locked by the keeper, the handle is stored in a resting position by the keeper. Simultaneously the keeper is in turn locked by the handle.

It is therefore an object of this invention to provide a boat raising device with a novel locking means.

It is a further object of this invention to provide a simple, easily operated, and economically manufactured locking means for a boat raising device.

Still a further object is to provide a boat raising device designed for greater accessibility to the operating mechanism.

Another object is to provide a boat raising device designed to minimize the stress on and the wear of the locking and operating mechanisms.

Still another object is to provide a boat raising device with a novel double locking means.

These objects and other features and advantages of this invention will become readily apparent by reference to the following description when taken in conjunction with the accompanying drawings.

BRIEF DESCRIPTION OF THE DRAWINGS

The appended drawings illustrate the invention, wherein.

DESCRIPTION OF THE PREFERRED EMBODIMENT

Figure 1:
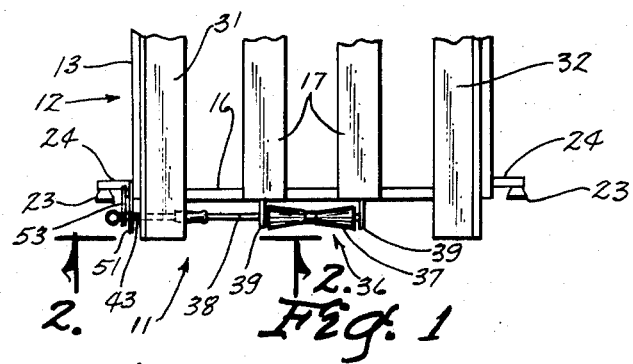
FIG. 1 is a top plan fragmentary view of the preferred embodiment of this invention mounted upon a boat trailer.

Referring now to the drawings, FIG. 1 generally depicts the preferred embodiment of the invention of 11 in attachment with a fragmentary boat trailer 12. The boat trailer 12, of which only the rear partition is shown, comprises a frame having angular side members 13 attached to an end member 16. Elongated walkways 17 and bunks 31, 32 are attached to the frame in parallel relation with each other and with the longitudinal axis of the trailer 12. A boat (not shown) is supported on the walkways 17 and the bunks 31, 32. Conventional tail lights 23 are attached to the trailer 12 by means of brackets 24.

The preferred embodiment of the invention 11 generally includes a lift assembly 36, a handle member 43, and a keeper member 53.

Figure 2:
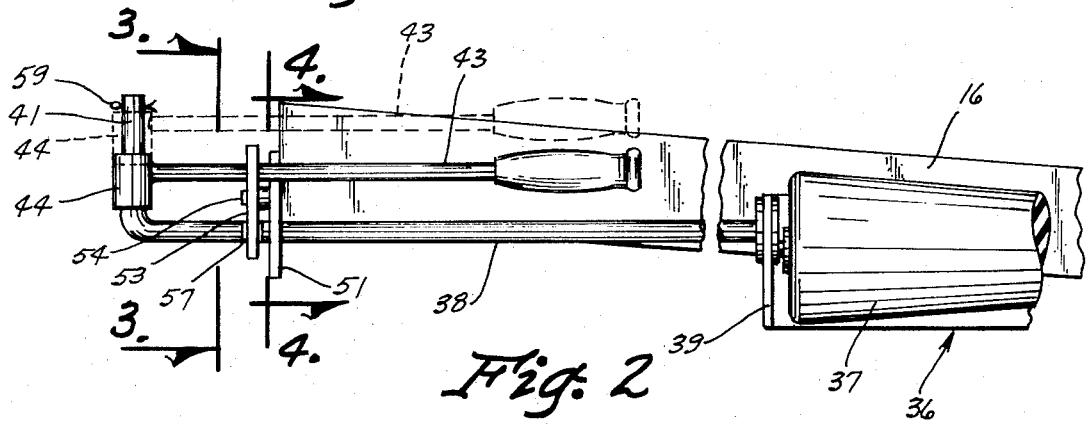
FIG. 2 is an enlarged, foreshortened, fragmentary side elevational view of the invention taken along line 2—2 in FIG. 1.

More particularly the lift assembly 36, depicted in FIG. 2, includes a lift roller 37, substantially hyperboloid in shape (FIG. 1) and an elongated shaft 38. The elongated shaft 38 passes through an end bracket 39 and terminates in a coupling 40. The roller 37 is attached between the coupling 40 and another end bracket 39, (FIG. 1). The coupling 40 joins the roller 37 and shaft 38 in such a manner that the longitudinal axis of each are offset with respect to the other. The shaft 38 also passes through a side bracket 51 and terminates in a perpendicular portion 41. Flattened portions 57 are located on directly opposite sides of shaft 38 and are formed in parallel relation to each other and to the plane formed by portion 41 and shaft 38. The portions 57 are located close to bracket 51 between the perpendicular portion 41 and the bracket 51. The whole lift assembly 36 is mounted upon the trailer 12 by means of the end brackets 39 attached to the end member 16 and the side bracket 51 attached to the side member 13. The assembly 36 is rotatable about its longitudinal axis within the brackets 39, 51.

The elongated handle member 43 is depicted in FIG. 2. The handle 43 terminates in a transverse journal member 44 which slidably receives the perpendicular portion 41 of the shaft 38. The hatched lines illustrate a position to which the handle 43 may be slid. A cotter key 59 is passed through the portion 41 to prevent the handle 43 from sliding off (See FIG. 5).

Figures 3, 4:
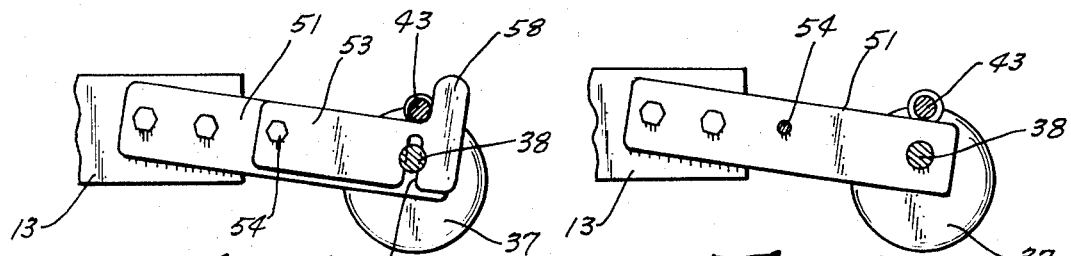
FIG. 3 is a transverse sectional view of the invention taken along line 3—3 in FIG. 2, and depicting the keeper means of this invention.
FIG. 4 is a transverse sectional view of the invention taken along line 4—4 in FIG. 2.

The keeper member 53 (FIG. 3) is a substantially rectangular blank attached by a pivot 54 to the side bracket 51. The keeper portion at the end opposite the pivot 54 includes an upright projection 58 and an oppositely directed notch 56, the projection 58 forming a right angle with the upper edge of the member 53. The notch 56 fits over the flattened portions 57 of the shaft 38 when the keeper 53 engages the shaft 38.

When the boat trailer 12 is in use transporting or supporting a boat, the roller 37 is locked in a first lower position, depicted in FIG. 2. When it is desired that the boat be removed from the trailer, the roller 37 is unlocked and moved to a raised second position, depicted in FIG. 5. The boat is thereby lifted off the bunks 31, 32 and walkways 17 which have been frictionally holding it, and is thereafter easily slid off the trailer 12 over the roller 37.

Figure 5:
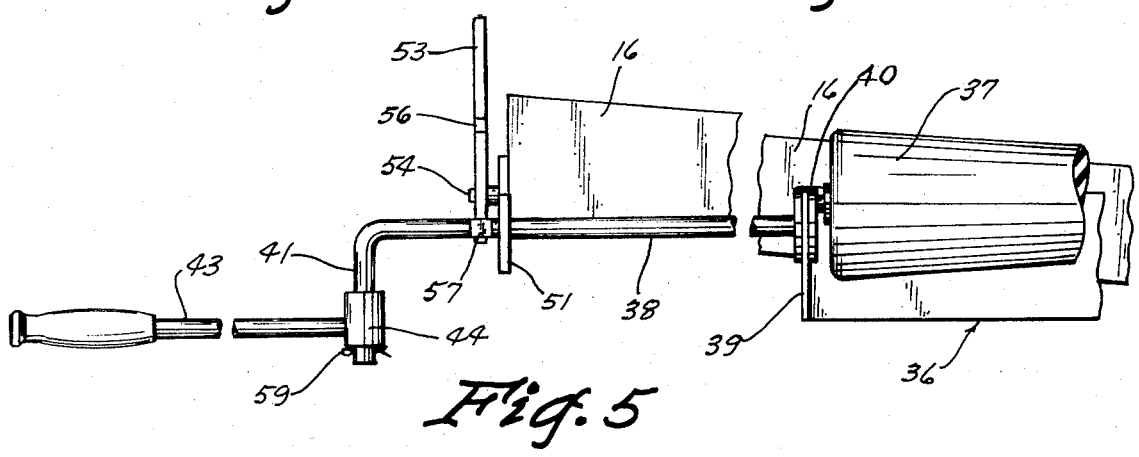
FIG. 5 is an enlarged, foreshortened, fragmentary, side elevational view of the invention showing the roller member in elevated position.

The roller 37 is moved between the lower first position of FIG. 2 and the second raised position of FIG. 5 by rotation of the lift assembly 36. The handle member 43 is first slid upward, from its FIG. 2 full line position, along the portion 41 and away from its resting place upon the keeper 53 against the projection 58. The handle 43 is then rotated 90° about the portion 41 to a position perpendicular to the shaft 38 and end member 16, and directed away from the trailer 12. The keeper 53 is then pivotally disengaged from the shaft 38 and moved upwardly to a vertically disposed position as depicted in FIG. 5. Downward pressure is then applied to the handle 43, and the assembly 36 rotates. The roller 37, due to its offset relation with the shaft 38, is thereby moved to the second raised position of FIG. 5. The keeper 53 may then pivotally be lowered to engage the flattened portions 57 again, locking the assembly 36 against rotation and the roller 37 in raised position. The handle 43 may then be rotated about portion 41 another 90°, as depicted in FIG. 5, to effectively remove it from the work area as the boat is being slid off the roller 37.

To move the roller 37 back to the first lower position the process is reversed. After the keeper 53 has again locked the assembly 36 against rotation, the handle 43 rests upon the keeper 53 against the ear 58 thereby locking the keeper 53 against any accidental pivot motion.

Although a preferred embodiment has been disclosed herein, it is to be remembered that various modifications and alternate constructions can be made thereto without departing from the full scope of the invention, as defined in the appended claims.

I claim:

1. For use with a trailer for carrying a boat or the like, a safety locked boat raising device comprising:

a lift assembly adapted to be mounted at one end of the trailer and having a roller member and a shaft, said roller member being mounted offset relative to its longitudinal axis upon the end of said shaft, said shaft having a perpendicularly formed portion at the end opposite said roller, and said lift assembly being rotatable about its longitudinal axis whereby said roller is moved between a lower first position and a raised second position;

handle means movably attached to said formed portion whereby said assembly is rotatable about its longitudinal axis by operation of said handle means; and keeper means pivotally attached at one end to the boat trailer and movable to engage said shaft with the other end whereby said assembly is held in locked position against rotation, said shaft including parallel flattened portions for receiving said keeper means, said portions being parallel to the plane containing said first and second positions of said roller, whereby said shaft is prevented from rotating and said roller is locked in said first or second position by engagement of said keeper means with said shaft, said keeper means including a projection which is engageable by said handle means when said keeper means has locked said roller in said lower first position, whereby said keeper means is locked in engagement with said shaft.

* * * * *